Patented Dec. 31, 1935

2,026,218

UNITED STATES PATENT OFFICE 2,026,218

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application December 31, 1934, Serial No. 760,024

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings."

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent used in our process consists of a sulfonation product of an unsaturated acid body derived by the thermal or pyrolytic decomposition of unsaturated oxy fatty acid body. Unsaturated oxy fatty acid bodies include such naturally-occurring materials as ricinoleic acid or its glyceride, castor oil. These fatty bodies are characterized by the presence of an ethylene linkage and also by the presence of the oxygen-containing hydroxyl radical, and are frequently referred to as oxy acids. Unsaturated oxy acid bodies may be obtained in the manner described in our co-pending application for patent of De Groote and Keiser, Serial No. 760,025, filed December 31, 1934, in which there is disclosed a process for oxidizing or blowing relatively highly unsaturated fatty bodies so as to yield an unsaturated oxy fatty body, which is subsequently subjected to thermal or pyrolytic decomposition. Said unsaturated oxy fatty bodies so obtained have an ethylene linkage and are analogous, in many respects, to castor oil or ricinoleic acid. The procedure employed to produce them, briefly described, consists essentially of subjecting a relatively highly unsaturated fatty acid or fatty oil, such as a marine oil having an iodine number of 120 to approximately 180 or 190, to a conventionally oxidizing or blowing process, with a drop in iodine number to approximately ⅔ or ½ its original value, and with a corresponding increase in acetyl value or oxygen absorption. The oxidized oil is subjected to pyrolytic decomposition in the same manner as ricinoleic acid or castor oil, so as to yield unsaturated acids similar to hendecenoic acid or its esters having either a few more divalent $CH_2$ groups, or possibly, a few less, but being in the same molecular weight range and exhibiting essentially the same properties, especially in regard to sulfonation reactions, as is exhibited by hendecenoic acid derived from castor oil or ricinoleic acid. It is to be understood that what is said subsequently in regard to the sulfonation of hendecenoic acid derived from castor oil, applies with equal force and effect to the chemically similar acids derived in the manner aforementioned.

In practising our process we prefer to use a treating agent or demulsifying agent consisting of, or comprising a sulfo hendecenoic acid body in the form of an acid or a salt or an ester, derived from castor oil.

Hendecenoic acid is an unsaturated acid similar to certain fatty acids, but apparently not occurring naturally in any fat or oil. It is a lower homologue of oleic acid, and is obtained by distilling ricinoleic acid or the glyceride thereof (castor oil) under diminished or atmospheric pressure. It is sometimes known as undecylenic acid. The method of producing said acid is well known and is described in the publication "Dictionary of Applied Chemistry", by Thorpe, 1922. In volume 4, pages 630 and 631 of the said publication the reaction of hendecenoic acid is indicated as follows:

$$C_{18}H_{34}O_3 = C_6H_{13}CHO + C_{11}H_{20}O_2$$

but in the text the term "hendecatoic acid" is erroneously used to refer to the product $C_{11}H_{20}O_2$. However, volume 3, page 515 of the said publication properly identifies hendecatoic acid as "undecylic acid" $(C_{11}H_{22}O_2)$.

In producing the treating agent used in our process it is not necessary that the hendecenoic acid which is employed as the raw material for producing sulfo-hendecenoic acid be absolutely pure, but it may be of a technical quality, so as to contain some unconverted castor oil and certain products of decomposition other than hendecenoic acid. It may contain some oenanthol (heptoic aldehyde). This aldehyde can be removed by blowing air or an inert gas through the commercial hendecenoic acid at a relatively low temperature. If air is employed, the heptoic aldehyde may be converted into heptoic acid, which may remain in the hendecenoic acid without objection. To produce said treating agent, hendecenoic acid, in either a pure form or a reasonably pure form, or in the form of an ester, is subjected to sulfation in the various manners applied in the sulfonation of its higher homologue, oleic acid. It is well known that oleic acid may be sulfonated at a relatively low temperature, for instance, 35° or less, with 66° Baumé sulfuric acid to yield a fatty acid sulfate, i. e., oleic acid hydrogen hydrogen sulfate. It is also known that oleic acid may be sulfonated at or near the boiling point of water with sulfuric acid, or at a lower temperature with an onium compound of sulfuric acid to yield a true sulfonic acid. Such true sulfonic acids are differentiated from fatty acid sulfates above referred to by the fact that they do not decompose on boiling with dilute hydrochloric acid. A further well known method for sulfonating oleic acid is to sulfonate in the presence of a suitable aromatic compound, such as benzene, phenol, naphthalene, beta naphthol, etc. so as to produce a sulfo aromatic "fatty" acid. Such sulfonation products are characterized by the presence of a sulfonic acid radical, but said sulfonic acid radical is attached to the aromatic nucleus and not directly to the hydrocarbon fatty chain of the fatty acid.

Although one can produce pure sulfoleic acid, i. e., oleic acid hydrogen hydrogen sulfate, yet the expression sulfoleic acid is most commonly employed in the arts to indicate the commercial product obtained by sulfation or sulfonation of oleic acid which contains not only oleic acid hydrogen sulfate, for example, but also the hydrolytic decomposition product, i. e., hydroxystearic acid, and also products obtained by the auto-esterification of hydroxystearic acid, such as hydroxystearyl hydroxystearic acid. Unreacted oleic acid or its ester derived by reaction with hydroxystearic acid, may be present. Lactones may be present. Sulfonated poly acids may be present. Sulfoleic acid may be almost free from sulfur-containing constituents. Similarly, the sulfonation employed in the manufacture of a true sulfonic acid or a sulfo-aromatic fatty acid, is accompanied by similar hydrolytic decomposition products and other products obtained by the esterification of or etherization of the hydroxylated bodies present. In the same manner that the expression sulfoleic acid has been used broadly to indicate sulfo derivatives obtained by all three of these processes, together with the accompanying materials, similarly the expression sulfohendecenoic acid is herein employed in the same analogous manner to indicate the analogous products obtained from hendecenoic acid alone or in presence of such reactive aromatic compounds as benzene, phenol, naphthalene, beta naphthol, etc.

The sulfonation of hendecenoic acid must be handled cautiously so as to prevent polymerization with the formation of insoluble, gummy or resin-like products. This can be accomplished most readily by a relatively low temperature sulfonation, such as 10° C. or less; the use of sulfuric acids of strengths slightly less than 66° Baumé; or else sulfonation in the presence of organic anhydrides, such as acetic anhydride. Sulfonation in the presence of a molecular amount of a readily sulfonatable aromatic compound, such as phenol, is also a suitable procedure.

When the sulfated mass obtained by sulfation in absence of an aromatic compound is diluted with water there is a decomposition or hydrolysis of some of the fatty acid sulfate if present. The fatty acid sulfate referred to is hendecenoic acid hydrogen hydrogen sulfate, which may also be characterized as a substitution product of the saturated hendecatoic acid and may be considered hydrogen sulfate hendecatoic acid, i. e., an acid in which one hydrogen of hendecatoic acid (undecylic acid) has been replaced by a hydrogen sulfate radical. Thus, the decomposition product obtained by hydrolysis of hydrogen sulfate hendecatoic acid is hydroxy hendecatoic acid, and the poly acid obtained by auto-esterification of two moles of hydroxy hendecatoic acid is hydroxy hendecatoyl hydroxy hendecatoic acid. The analogy to the formation of hydroxystearic acid, poly acids, lactones, sulfated poly acids, etc. therefrom is evident.

The use of demulsifying agents consisting of various sulfo acids, or carboxy acids, or compounds having both a sulfo group and a carboxyl group, is well known in the treatment of water-in-oil emulsions. In the use of conventional demulsifying agents it is the common practice to use them not only in the form of acids, but also in the form of salts or esters, or half salts, or half esters, or ester salts, in case of dibasic acids. Where such reagents have both a carboxylic hydrogen and a sulfonic hydrogen, it is well known that only the sulfonic hydrogen need be neutralized, if desired. The salts generally employed are the sodium salt, potassium salt, ammonium salt, calcium, magnesium, the triethanolamine salt, etc. The esters may be employed, such as the methyl ester, ethyl ester, propyl ester, butyl ester, amyl ester, hexyl ester, octyl ester, etc. Aromatic or cyclic esters may be employed. What has been said in regard to the use of conventional demulsifying agents applies also to the materials employed as the demulsifying agent of our process.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfoaromatic type, etc.

It is well known that conventional demulsifying agents may be used in a water-soluble form, or in an oil-soluble form, or in a form exhibiting both oil and water-solubility. Sometimes they may be used in a form which exhibits relatively limited water-solubility and relatively limited oil-solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of our process.

The following is one procedure that may be employed to produce a demulsifying agent of the kind contemplated by our invention: 500 lbs. of hendecenoic acid of technical purity, obtained by heating castor oil to 270 to 280°, with a loss in weight of not exceeding 10%, or in any other suitable manner, is mixed with 150 lbs. of acetic anhydride, and then sulfonated with 500 lbs. of concentrated 66° Baumé sulfuric acid at a temperature of not over 10° C. The reaction mixture resulting from the sulfonation (sulfation) process is washed in the cold with twice its volume of concentrated Glauber's salt solution, and after complete separation, the upper fatty layer is withdrawn and at least partially neutralized with ammonium hydroxide, so that the final product is an ammonium sodium double salt, probably in a form wherein the sulfonic hydrogen is replaced by a sodium atom and the carboxylic hydrogen by an ammonium radical. The non-sulfo acids present would be at least partially neutralized with ammonia. The sulfo bodies are present as sulfates.

As stated previously, it has been so common to use a conventional demulsifying agent derived from an acid in the form of the acid itself, or in the form of a salt, or in the form of an ester, that the expression "acid body" is frequently employed to mean the acid itself, or an ester thereof, or a salt thereof. The word "body" is herein employed in this same sense in conformity with its prior usage in the trade, and particularly in various patents of the prior art. Half salts and half esters are considered as salts, and esters, respectively.

In practising our invention a treating agent or demulsifying agent of the kind above described is brought into contact with or caused to act upon the emulsion to be treated, in any of the various ways or by any of the various apparatus now generally used to resolve or break petroleum emulsions with a chemical reagent.

Having thus described our invention, what we claim as new and desire to secure by Letters Patent is:

1. A process for breaking a petroleum emulsion of the water-in-oil type, which consists in subjecting the emulsion to the action of a demulsifying agent, comprising a sulfo body derived by sulfonation of an unsaturated acid body produced by thermal decomposition of an unsaturated oxy fatty material.

2. A process for breaking a petroleum emulsion of the water-in-oil type, which consists in subjecting the emulsion to the action of a demulsifying agent, comprising a sulfo body in the form of a salt, derived by sulfonation of an unsaturated acid body produced by thermal decomposition of an unsaturated oxy fatty material.

3. A process for breaking a petroleum emulsion of the water-in-oil type, which consists in subjecting the emulsion to the action of a demulsifying agent, comprising a sulfohendecenoic acid body in the form of a salt.

4. A process for breaking a petroleum emulsion of the water-in-oil type, which consists in subjecting the emulsion to the action of a demulsifying agent, comprising a sulfohendecenoic acid body in the form of a water-soluble salt.

5. A process for breaking a petroleum emulsion of the water-in-oil type, which consists in subjecting the emulsion to the action of a demulsifying agent obtained by sulfation of hendecenoic acid at approximately 10° C. after admixture with acetic anhydride, followed by a washing process with saturated Glauber's salt solution and subsequent separation with at least partial neutralization of the separated upper fatty layer with ammonium hydroxide.

6. A process for breaking a petroleum emulsion of the water-in-oil type, which consists in subjecting the emulsion to the action of a demulsifying agent, comprising a sulfo body in the form of an acid, derived by sulfonation of an unsaturated acid body produced by thermal decomposition of an unsaturated oxy fatty material.

7. A process for breaking a petroleum emulsion of the water-in-oil type, which consists in subjecting the emulsion to the action of a demulsifying agent, comprising a sulfo body in the form of an ester, derived by sulfonation of an unsaturated acid body produced by thermal decomposition of an unsaturated oxy fatty material.

8. A process for breaking a petroleum emulsion of the water-in-oil type, which consists in subjecting the emulsion to the action of a demulsifying agent, comprising a sulfohendecenoic acid body in the form of an acid.

9. A process for breaking a petroleum emulsion of the water-in-oil type, which consists in subjecting the emulsion to the action of a demulsifying agent, comprising a sulfohendecenoic acid body in the form of an ester.

MELVIN DE GROOTE.
BERNHARD KEISER.